(12) United States Patent
Oltheten et al.

(10) Patent No.: US 10,173,787 B1
(45) Date of Patent: Jan. 8, 2019

(54) ROTOR SPEED INDICATION SYSTEMS FOR ROTORCRAFT

(71) Applicant: Bell Helicopter Textron Inc., Fort Worth, TX (US)

(72) Inventors: Erik John Oltheten, Fort Worth, TX (US); Aaron Thomas Halverson, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/894,880

(22) Filed: Feb. 12, 2018

(51) Int. Cl.
  *G08B 21/00* (2006.01)
  *B64D 45/00* (2006.01)
  *B64C 27/04* (2006.01)
  *B64D 35/00* (2006.01)

(52) U.S. Cl.
  CPC .............. *B64D 45/00* (2013.01); *B64C 27/04* (2013.01); *B64D 35/00* (2013.01)

(58) Field of Classification Search
  CPC ........ B64D 45/00; B64D 35/00; B64D 43/00; B64D 27/023; B64D 35/04; B64C 27/04; B64C 2201/108; G08G 5/0065
  USPC ............... 340/946, 959, 945, 971, 973, 963; 701/14
  See application file for complete search history.

(56) References Cited

U.S. PATENT DOCUMENTS

| | | | |
|---|---|---|---|
| 6,195,598 B1 | 2/2001 | Bosqui et al. | |
| 7,414,544 B2 | 8/2008 | Oltheten et al. | |
| 8,825,237 B2 * | 9/2014 | Covington | G01C 23/00 701/14 |
| 9,035,802 B2 | 5/2015 | McCollough et al. | |
| 9,463,874 B2 | 10/2016 | Vallart et al. | |
| 9,630,724 B2 | 4/2017 | Oltheten et al. | |
| 2001/0044679 A1 | 11/2001 | Permanne | |
| 2009/0186320 A1 * | 7/2009 | Rucci | B64C 27/04 434/33 |
| 2016/0214733 A1 * | 7/2016 | Vallart | B64C 27/57 |

OTHER PUBLICATIONS

European Exam Report; Application No. EP 18167568; European Patent Office; dated Aug. 3, 2018.
European Search Report; Application No. EP 18167568; European Patent Office; dated Jul. 6, 2018.

* cited by examiner

*Primary Examiner* — Anh V La
(74) *Attorney, Agent, or Firm* — Lawrence Youst PLLC (57) ABSTRACT

A rotor speed indication system configured to communicate a rotor speed operating range for a twin engine rotorcraft having a rotor during one engine inoperable conditions. The rotor speed indication system includes a governing reference indicator located on a display and configured to communicate an upper operating range threshold. A droop reference indicator located on the display and configured to communicate a lower operating range threshold. A sensor configured to measure a current rotor speed of the rotor. A dynamic rotor speed indicator located on the display and configured to communicate the current rotor speed of the rotor such that when the dynamic rotor speed indicator is positioned between the governing reference indicator and the droop reference indicator on the display, the current rotor speed of the rotor is within the rotor speed operating range.

20 Claims, 6 Drawing Sheets

ROTOR SPEED INDICATION SYSTEMS FOR ROTORCRAFT

TECHNICAL FIELD OF THE DISCLOSURE

The present disclosure relates, in general, to managing rotor performance during continued takeoff and climbouts of a rotorcraft having one engine inoperable and, in particular, to rotor speed indication systems for rotorcraft that provide cues to assist the pilot in properly managing rotor droop during one engine inoperable continued takeoff and climbouts.

BACKGROUND

Multi engine rotorcraft may be type certified as Category-A rotorcraft. Such Category A rotorcraft experience the highest power demand from a single engine during the performance of a continued takeoff and climbout when one engine inoperable (OEI) conditions occur shorty after the takeoff decision point. In order to recover and continue flight under such OEI conditions, the pilot must fly a specific profile of airspeed and altitude while demanding full power from the remaining engine. Typically, the full authority digital engine control (FADEC) will limit the engine power upon reaching the maximum contingency power and/or emergency power rating of the engine. Once maximum engine power is reached, it may be desirable for the pilot to trade rotor inertia for increased rotorcraft performance. The use of this maneuver, however, results in a loss of rotor speed known as rotor droop. It has been found that engine power and rotor droop must be managed precisely throughout this maneuver in order to avoid rotor decay that exceeds a minimum rotor speed beyond which rotor speed recovery may be compromised. Accordingly, a need has arisen for improved systems that provide a rotorcraft pilot with cues to assist in properly managing rotor droop during a one engine inoperable continued takeoff and climbout.

SUMMARY

In a first aspect, the present disclosure is directed to a rotor speed indication system configured to communicate a rotor speed operating range for a twin engine rotorcraft having a rotor during one engine inoperable conditions. The rotor speed indication system includes a display. A governing reference indicator is located on the display and is configured to communicate an upper operating range threshold. A droop reference indicator is located on the display and is configured to communicate a lower operating range threshold. A sensor is configured to measure a current rotor speed of the rotor. A dynamic rotor speed indicator is located on the display and is configured to communicate the current rotor speed of the rotor such that when the dynamic rotor speed indicator is positioned between the governing reference indicator and the droop reference indicator on the display, the current rotor speed of the rotor is within the rotor speed operating range.

In some embodiments, the upper operating range threshold may be a normal governing speed, a takeoff governing speed and/or a governing speed greater than the normal governing speed such as a governing speed that is 103 percent of the normal governing speed. In certain embodiments, the lower operating range threshold may be a minimum allowable rotor speed to provide continued takeoff and climbout performance and/or a rotor droop speed less than the normal governing speed such as a rotor droop speed that is 97 percent of the normal governing speed. In some embodiments, the governing reference indicator, the droop reference indicator and the dynamic rotor speed indicator may be displayed as a bar graph. In such embodiments, the bar graph may have a range of 90 percent to 110 percent of a normal governing speed, the rotor speed operating range may be a linear distance between the governing reference indicator and the droop reference indicator on the bar graph and/or the linear distance between the governing reference indicator and the droop reference indicator on the bar graph may be a range of at least one quarter of the bar graph.

In certain embodiments, a dynamic engine power indicator may be located on the display and may be configured to communicate an engine power level of an operating engine. In such embodiments, the dynamic engine power indicator may include at least one rotary needle positioned within a power arc having one engine inoperable power ranges and an active limit indicator. The one engine inoperable power ranges may be a two-minute contingency power range and a thirty-second emergency power range. In addition, a power range time indicator may be located on the display to communicate a time remaining in an active one of the two-minute contingency power range and the thirty-second emergency power range.

In a second aspect, the present disclosure is directed to a method of communicating a rotor speed operating range during one engine inoperable conditions in a rotorcraft. The method includes providing a display; communicating an upper operating range threshold by locating a governing reference indicator on the display; communicating a lower operating range threshold by locating a droop reference indicator on the display; measuring a current rotor speed with a sensor; and communicating the current rotor speed of the rotor by locating a dynamic rotor speed indicator on the display such that when the dynamic rotor speed indicator is between the governing reference indicator and the droop reference indicator on the display, the current rotor speed of the rotor is within the rotor speed operating range.

The method may also include communicating a governing speed that is greater than a normal governing speed; communicating a rotor droop speed that is less than the normal governing speed; locating the governing reference indicator, the droop reference indicator and the dynamic rotor speed indicator on a bar graph having a range of 90 percent to 110 percent of a normal governing speed; expressing the rotor speed operating range as a linear distance between the governing reference indicator and the droop reference indicator on the bar graph and/or scaling the linear distance between the governing reference indicator and the droop reference indicator on the bar graph to have a range of at least one quarter of the bar graph.

In a third aspect, the present disclosure is directed to a rotorcraft that includes a body, first and second engines disposed within the body, a transmission coupled to the first and second engines and having a drive shaft, a rotor coupled to and operable to rotate with the drive shaft and a rotor speed indication system disposed within the body and configured to communicate a rotor speed operating range during one engine inoperable conditions. The rotor speed indication system includes a display. A governing reference indicator is located on the display and is configured to communicate an upper operating range threshold. A droop reference indicator is located on the display and is configured to communicate a lower operating range threshold. A sensor is configured to measure a current rotor speed of the rotor. A dynamic rotor speed indicator is located on the display and is configured to communicate the current rotor speed of the rotor such that when the dynamic rotor speed indicator is positioned between the governing reference indicator and the droop reference indicator on the display, the current rotor speed of the rotor is within the rotor speed operating range.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and nonmoving mechanical connections.

Figure 1A:
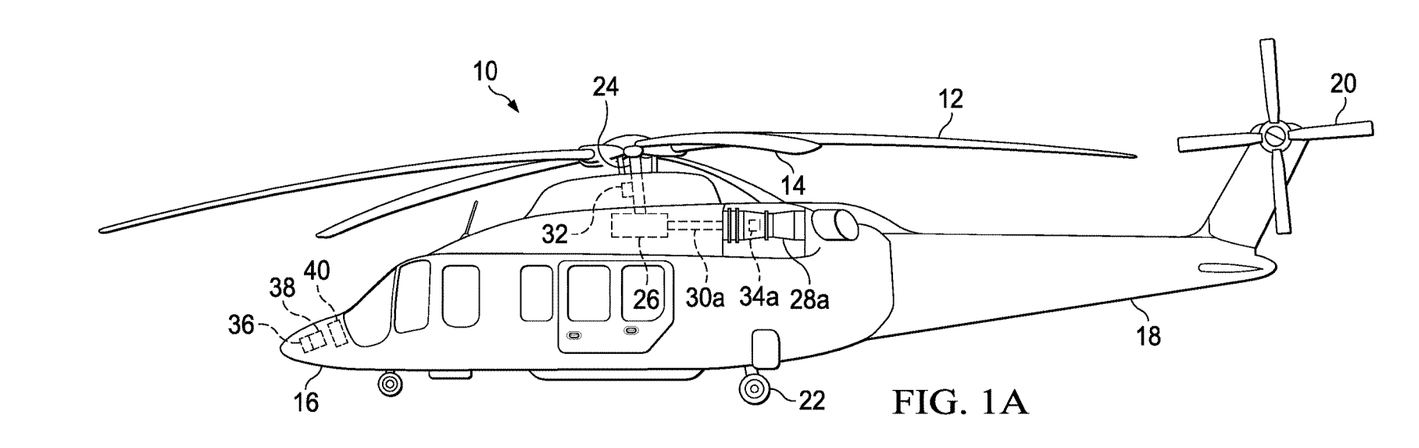
FIGS. 1A-1B are schematic illustrations of an exemplary helicopter having a rotor speed indication system in accordance with embodiments of the present disclosure.
Figure 1B:
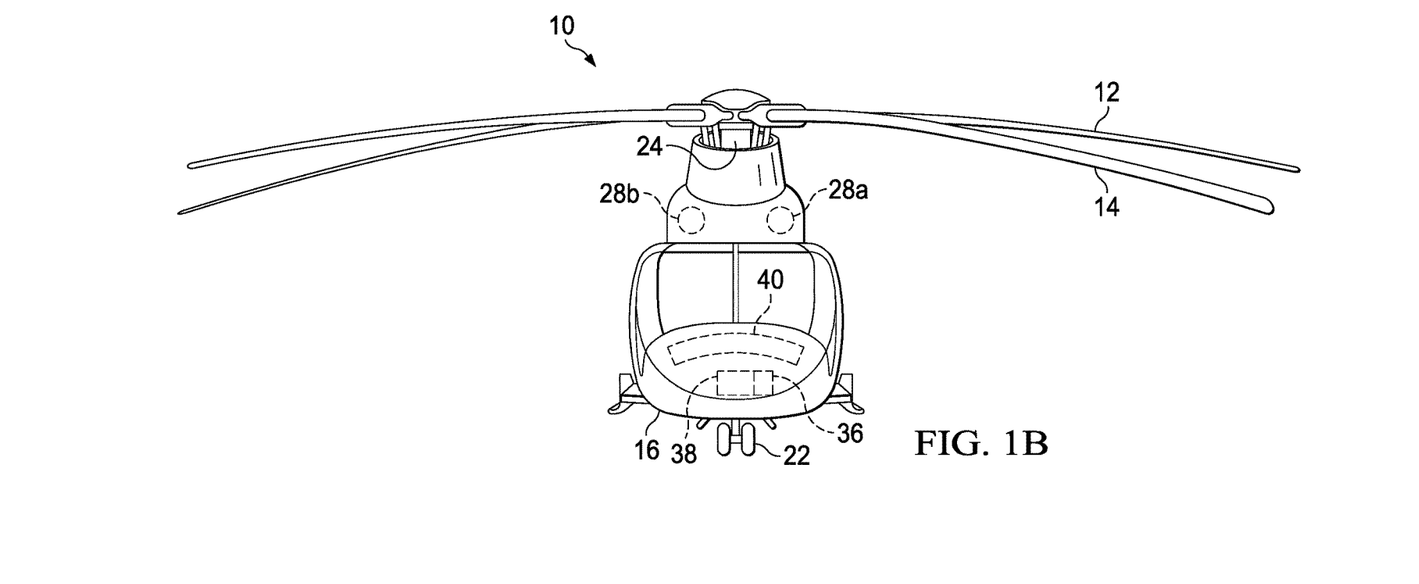

Referring now to FIGS. 1A-1B in the drawings, a rotorcraft depicted as helicopter 10 is schematically illustrated. Helicopter 10 has a main rotor 12 with a plurality of rotor blades 14. The pitch of rotor blades 14 can be collectively and cyclically manipulated to selectively control direction, thrust and lift of helicopter 10. Helicopter 10 includes a body depicted as fuselage 16 and tailboom 18. Helicopter 10 also includes an anti-torque system depicted as tail rotor 20. Helicopter 10 has a landing gear system 22 to provide ground support for the aircraft. Main rotor 12 is supported atop helicopter 10 by a mast 24, which connects main rotor 12 to a main gearbox 26. Main gearbox 26 includes a plurality of gears that are mechanically coupled to a pair of engines 28a, 28b that provide torque and rotational energy to main gearbox 26 via respective driveshafts, only driveshaft 30a being visible in the figure. In the illustrated embodiment, engines 28a, 28b are depicted as power turbine engines.

Main gearbox 26 includes a transmission that is used to adjust the engine output from the driveshafts to a suitable rotational speed so that engines 28a, 28b and main rotor 12 may rotate at optimum speeds during, for example, governing modes of flight operations. Helicopter 10 may be operated in a variety of governing modes based upon flight conditions. For example, helicopter 10 has an all engine operative flight mode (AEO) wherein each of engines 28a, 28b is operating. In addition, helicopter 10 has a one engine inoperative flight mode (OEI) wherein one of engines 28a, 28b is operating and the other of engines 28a, 28b is not operating. Helicopter 10 also has non-governing modes that may include preflight, run-up, shutdown and autorotation.

Figure 4A:
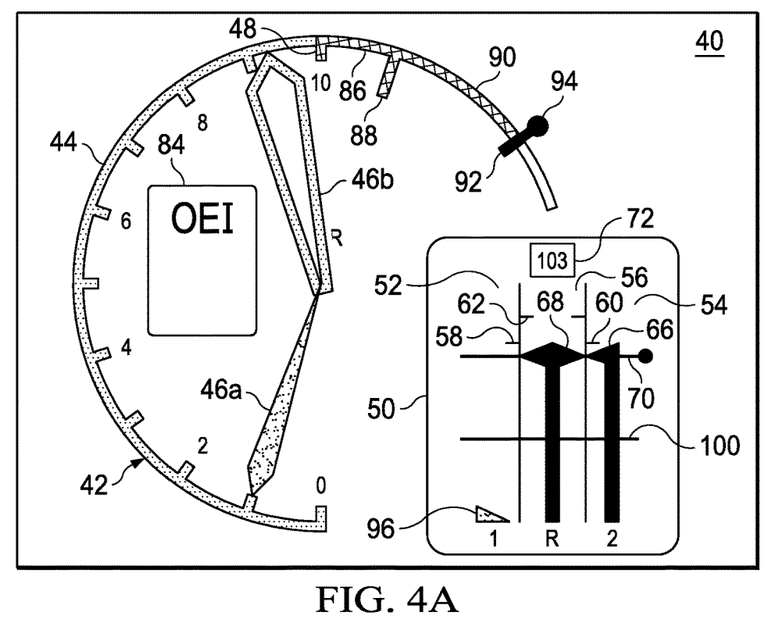
FIGS. 4A-4F are rotorcraft displays operating within a rotor speed indication system in accordance with embodiments of the present disclosure.
Figure 4B:
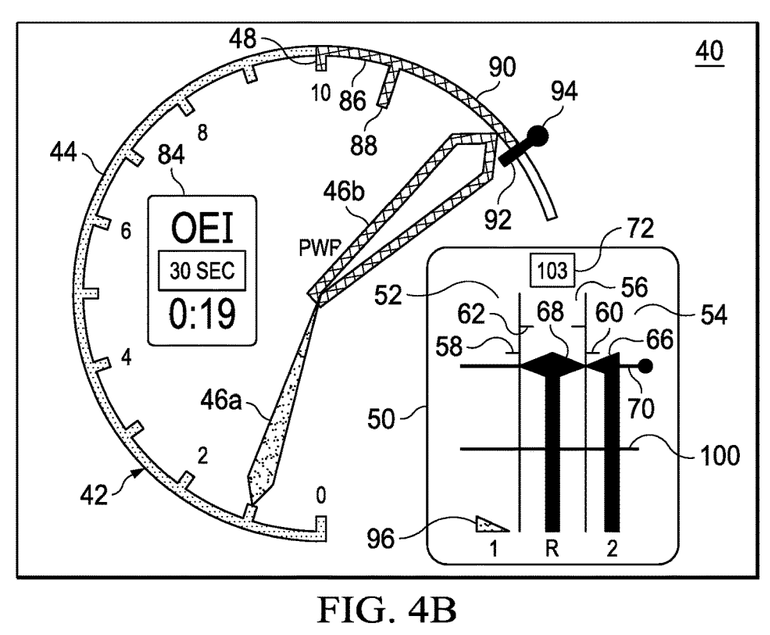
Figure 4C:
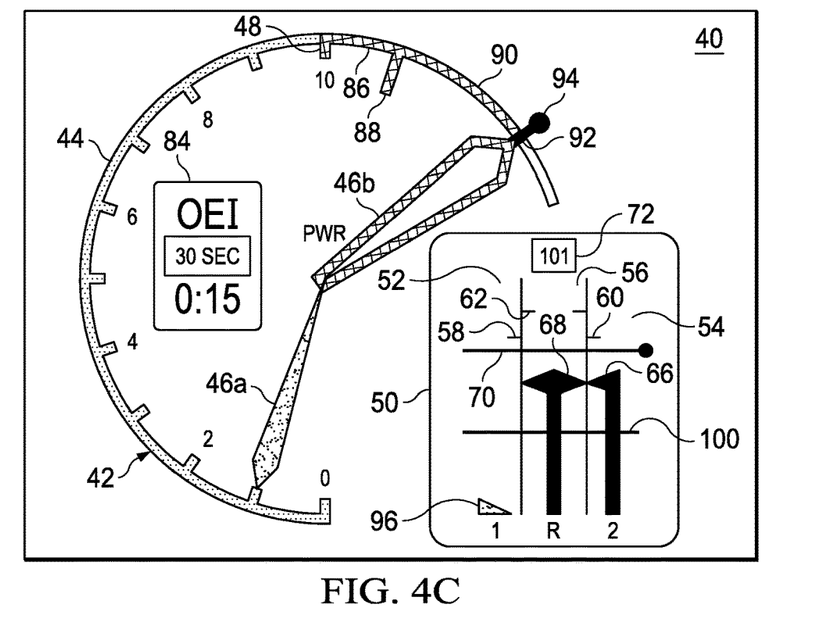
Figure 4D:
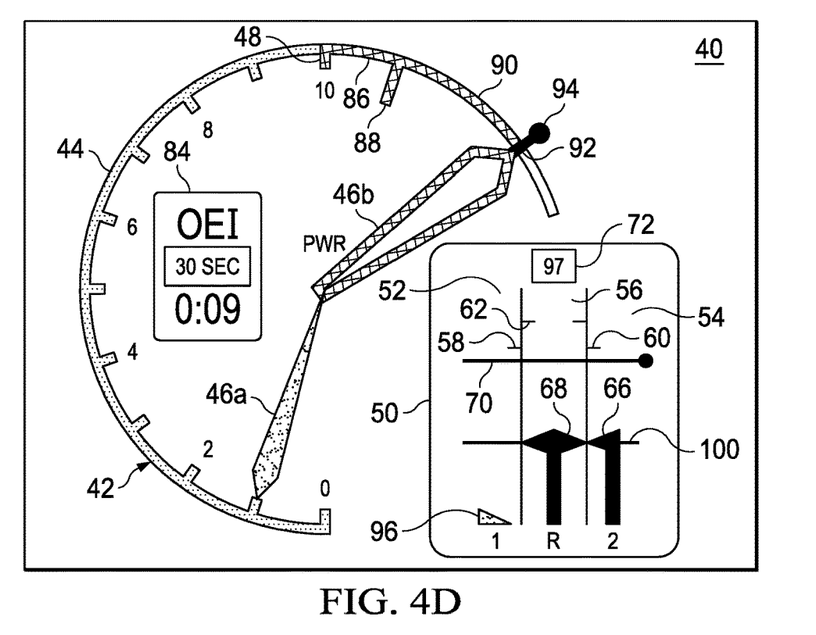

Each engine 28a, 28b has a power turbine speed (Np) and main rotor 12 has a main rotor speed (Nr). The typical optimum rotor speed, which is also the normal governing speed, is defined as 100 percent and may be referred to as the engine governing speed reference (Nref). Under normal operating conditions, the engine governor is configured to keep the rotor speed (Nr) equal to the selected value of the engine governing speed reference (Nref) by controlling the engine power turbine speed (Np). Helicopter 10, however, is operable to vary the governing speed to optimize performance in accordance with flight conditions. In these cases, the governing speed may vary by some percentage above or below the normal governing speed (Nref=100 percent). For example, helicopter 10 may have a takeoff governing speed that is greater than the normal governing speed, such as 103 percent, as best seen in FIG. 2B. Likewise, helicopter 10 may have a minimum rotor droop speed for continued takeoff and climbout during one engine inoperable conditions that is less than the normal governing speed, such as 97 percent, as best seen in FIG. 4D.

Helicopter 10 includes a plurality of sensors for measuring parameters such as the power turbine speed (Np), the main rotor speed (Nr), the engine torque (Qe), the measured gas turbine temperature (MGT), the gas turbine speed (Ng) and the mast torque (Qm), to name a few. In the illustrated embodiment, a main rotor speed sensor 32 and one of the power turbine speed sensors 34a are depicted. Data from sensors 32, 34a, as well as the other sensors, is processed by a calculation unit 36 which may be a part of a flight control computer 38 or may be an independent computing system. Calculation unit 36 sends selective data to a display 40 for communication to the pilot of helicopter 10. Display 40 includes, for example, a screen that may be dynamically configurable to present the data processed by calculation unit 36 in a specific manner based on the flight modes/conditions of helicopter 10.

Figure 2A:
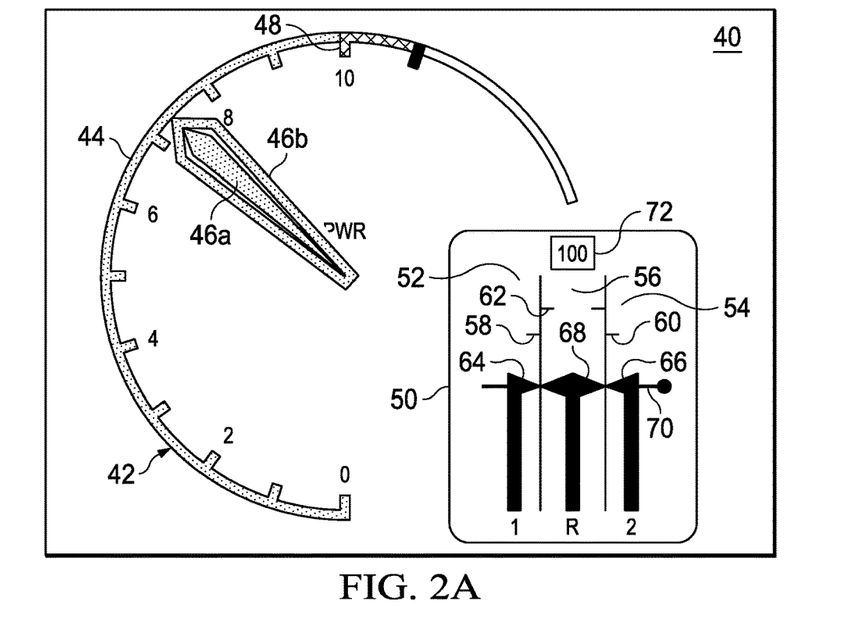
FIGS. 2A-2B are rotorcraft displays operating within a rotor speed indication system in accordance with embodiments of the present disclosure.
Figure 2B:
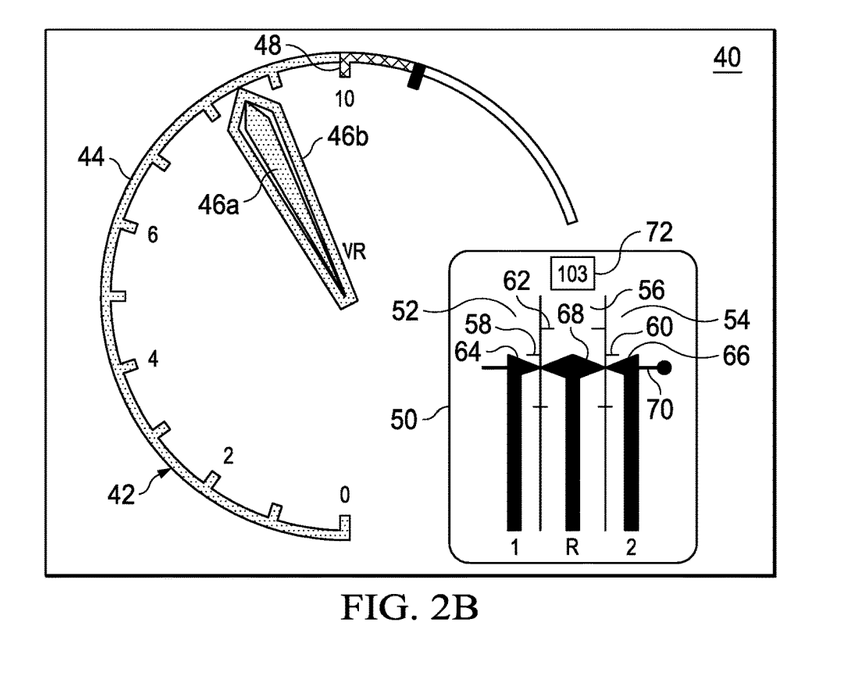

As best seen in FIG. 2A, an embodiment of display 40 is depicted during normal operations in all engine operative flight mode. As illustrated, display 40 has a dynamic engine power indicator depicted as power gauge 42 that describes the engine power levels of operating engines for helicopter 10 at a glance. Power gauge 42 including a power arc 44 depicted in round-dial format having rotary indicating needles 46a, 46b positioned therein. As discussed herein, power arc 44 has a common power scale. Indicating needles 46a, 46b respectively provide power data relating to engines 28a, 28b, which are also referred to as engine 1 and engine 2 in display 40 as discussed herein. Power gauge 42 is constructed and arranged to provide a combined indication of MGT, Ng, Qe and Qm in such a way that the relationship between these parameters and several operating limits is known via a single indicating needle.

For example, the number scale (1-10) shown on the left side of power arc 44 is non-dimensional and is provided for reference. The indication shown by each needle 46a, 46b is a derived indication based on MGT, Ng, Qe and Qm. Each parameter is normalized against the common scale of power arc 44 such that, for example, the maximum continuous power (MCP) occurs at location 10 and idle on a standard day occurs at location 3. The MCP point may be referred to hereinafter as the MCP limit 48 of power gauge 42. In embodiments of the present disclosure, the positions of needles 46a, 46b are driven by the parameter with the highest value on the normalized power gauge 42, which is the first parameter likely to reach MCP limit 48 or the one furthest past MCP limit 48. Conversion to the normalized scale is done in piece-wise linear fashion, so that various engine characteristics and parameter non-linearities can easily be corrected. In an embodiment, power arc 44 in the range from 1 to 10 and needles 46a, 46b associated with engine 1 and engine 2 are displayed in green.

Display 40 also includes a bar-graph indicator 50 having as a common rotor scale that is configured to communicate the power turbine speed (Np) of each engine, the main rotor speed (Nr) and the engine governing speed reference (Nref). Nr, Nref and Np are all scaled in percentage based on Nr. During normal flight conditions, bar-graph indicator 50 is displayed inset in power arc 44 and includes a first turbine gauge 52 that represents the power turbine speed (Np) of engine 1 and a second turbine gauge 54 that represents the power turbine speed (Np) of engine 2. Bar-graph indicator 50 also includes a main rotor gauge 56 positioned between first turbine gauge 52 and second turbine gauge 54. Main rotor gauge 56 represents the main rotor speed (Nr). In the illustrated embodiment, the range of bar graph indicator 50 is from the minimum allowed powered rotor speed to a margin beyond the limits of rotor and power turbine speed, such as 90 percent to 110 percent of the normal governing speed, thereby providing maximum display resolution for the range of interest during normal, powered flight.

The first turbine gauge 52 and second turbine gauge 54 include a first and a second turbine limit 58, 60, respectively. Similarly, the main rotor gauge 56 includes a rotor limit 62. These limits represent the maximum acceptable limits for the engine power turbine speed (Np) of engines 1, 2 and the rotor speed (Nr). In the illustrated embodiment, first and second turbine limits 58, 60 are set to 104 percent and the rotor limit 62 is set to 106 percent. Bar-graph indicator 50 includes dynamic engine power turbine speed indicators depicted as pointers 64, 66 and a dynamic rotor speed indicator depicted as pointer 68. Pointers 64, 66 are configured to indicate, respectively, the engine power turbine speed (Np) of engines 1, 2. Pointer 68 is configured to indicate the main rotor speed (Nr). Each pointer 64, 66, 68 consists of a filler bar that extends from the bottom of the respective vertical bar gauge 52, 54, 56 to the height corresponding to the Np and Nr values. In an embodiment, each pointer 64, 66, 68 is displayed in green.

Bar-graph indicator 50 also includes a governing reference indicator depicted as a horizontal bar 70 that represents the engine governing speed reference (Nref). In the illustrated embodiment, governing reference indicator 70 passes across all three vertical bar gauges 52, 54, 56 and is marked to the right by a filled circle. In an embodiment, the color of governing reference indicator 70 is an indication of whether the Nref value is automatically set to the current value or manually set to the current value. For example, an automatic determination of Nref in accordance to airspeed and altitude is indicated by magenta coloring of governing reference indicator 70, while selection to a fixed manual value is indicated by cyan coloring of governing reference indicator 70. During normal flight conditions, the engine governing speed reference (Nref) is set to the normal governing speed (Nref=100 percent) such that the position of governing reference indicator 70 is in the center of bar-graph indicator 50 with pointer 64, 66, 68 match up, as shown in FIG. 2A. In the illustrated embodiment, bar-graph indicator 50 displays the main rotor speed (Nr) value 72 above vertical bar gauge 56 in large text and may be colored based on the flight conditions.

Helicopter 10 is operable for automatic or manually adjustments of the engine governing speed reference (Nref) for certain flight conditions. As best seen in FIG. 2B, helicopter 10 has a takeoff governing speed that is greater than the normal governing speed. In the illustrated embodiment, this increased takeoff governing speed is communicated to the pilot by governing reference indicator 70 moving up to the 103 percent location on bar-graph indicator 50 showing that the current Nref=103 percent. Bar-graph indicator 50 also displays the main rotor speed (Nr) value 72 above vertical bar gauge 56 as 103. Under these flight conditions, with the engine governing speed reference (Nref) set to the takeoff governing speed (Nref=103 percent), pointer 64, 66, 68 are match up indicating an increase in the engine power turbine speed (Np) of engines 1, 2 and the main rotor speed (Nr) to 103 percent.

Figure 3:
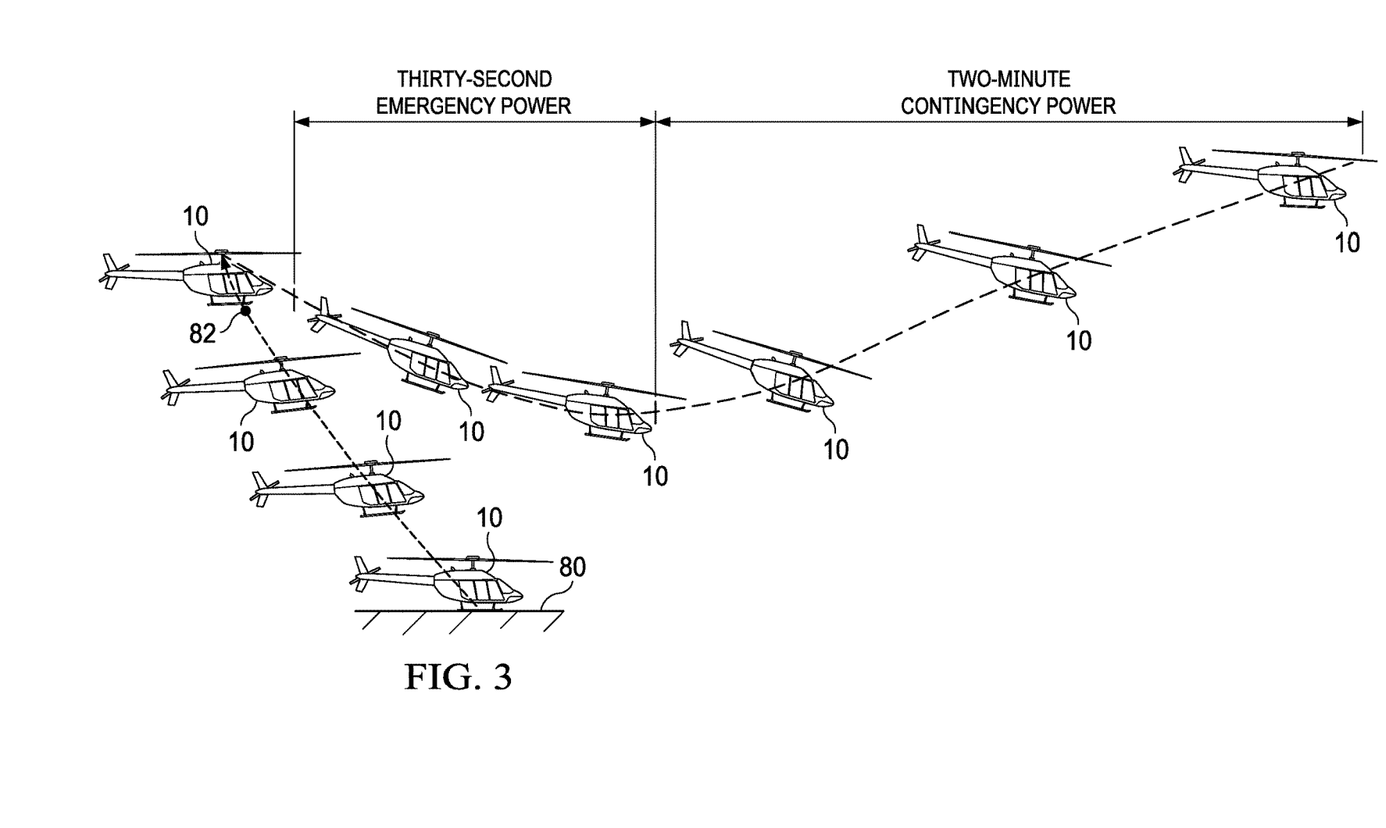
FIG. 3 is a schematic illustration of a sequential flight scenario of a helicopter conducting a continued takeoff and climbout maneuver in accordance with embodiments of the present disclosure.

Referring now to FIG. 3, a one engine inoperable takeoff scenario of helicopter 10 will now be described. In the illustrated embodiment, helicopter 10 is a twin engine rotorcraft certified as a Category-A rotorcraft. Helicopter 10 must therefore be capable of utilizing scheduled takeoff and landing operations under a critical engine failure concept, which assures adequate designated surface area and adequate performance capability for continued safe flight in the event of engine failure. In one example, helicopter 10 must be capable of performing a continued takeoff and climbout when one engine inoperable (OEI) conditions occur shorty after the takeoff decision point, which may also be referred to as a Category-A maneuver. In FIG. 3, helicopter 10 is initially positioned on a helipad 80 on which helicopter 10 performs its start-up procedure. Upon completion of the start-up procedure, display 40 of helicopter 10 should be in the configuration depicted in FIG. 2B with the engine governing speed reference (Nref) set to the takeoff governing speed (Nref=103 percent) as indicated by governing reference indicator 70 and with pointer 64, 66, 68 matched up with the engine power turbine speed (Np) of engines 1, 2 and the main rotor speed (Nr) at 103 percent.

As the pilot increases the collective and adds some aftward cyclic, helicopter 10 lifts off from helipad 80 with a slight aftward takeoff path such that the pilot is able to see helipad 80 in the event of a rejected takeoff. In this case, helicopter 10 reaches the takeoff decision point 82 based upon the airspeed and height of helicopter 10. At this point, helicopter 10 has a fault with engine 1 and is now in a one engine inoperable (OEI) condition. Upon entering the OEI condition, display 40 dynamically redefines the information communicated to the pilot. For example, as best seen in FIG. 4A, an OEI flag 84 has appeared within power arc 44. In addition, needle 46a associated with engine 1 points to near zero and has changed color from green to grey. The scale of power arc 44 has adjusted such that the OEI maximum continuous power (MCP) limit is at location 10. In an embodiment, power arc 44 in the range from 1 to 10 and needle 46b associated with engine 2 remain green. In OEI conditions, past location 10 on power arc 44 is a two-minute contingency power range 86 that extends to contingency power limit indicator 88. Past contingency power limit indicator 88 on power arc 44 is a thirty-second emergency power range 90 that extends to emergency power limit indicator 92 and engine operating limit indicator 94. In an embodiment, power arc 44 in two-minute contingency power range 86 and thirty-second emergency power range 90 is yellow. In addition, contingency power limit indicator 86 is yellow, emergency power limit indicator 92 is red and engine operating limit indicator 94 is blue.

The loss of engine 1 is also reflected in bar-graph indicator 50 in which pointer 64 has dropped off the scale and is indicated by a grey wedge 96 at the bottom of the depicted range. In addition, bar-graph indicator 50 now includes a droop reference indicator depicted as a horizontal bar 100 that represents the minimum rotor droop speed (Ndroop) for continued takeoff and climbout during one engine inoperable conditions. In the illustrated embodiment, droop reference indicator 100 passes across all three vertical bar gauges 52, 54, 56. The minimum rotor droop speed is less than the normal governing speed. In the illustrated embodiment, the minimum rotor droop speed is depicted by droop reference indicator 100 as Ndroop=97 percent on bar-graph indicator 50. In an embodiment, droop reference indicator 100 is indicated by white coloring.

In OEI mode, governing reference indicator 70 remains in bar-graph indicator 50 to provide the pilot of helicopter 10 with a visual cue of an upper operating range threshold of the rotor speed operating range for OEI operations and in particular the Category-A maneuver. Similarly, droop reference indicator 100 on bar-graph indicator 50 provides the pilot of helicopter 10 with a visual cue of a lower operating range threshold of the rotor speed operating range for OEI operations and in particular the Category-A maneuver. Importantly, in OEI mode, bar-graph indicator 50 providing maximum display resolution for the range of interest. In the illustrated embodiment, the range of bar-graph indicator 50 is 90 percent to 110 percent of the normal governing speed. The rotor speed operating range, which defined between governing reference indicator 70 and droop reference indicator 100, is 97 percent to 103 percent of the normal governing speed. In this case, the rotor speed operating range is more than one quarter of the entire range of bar-graph indicator 50; namely, the rotor speed operating range is three tenths of the entire range of bar-graph indicator 50. The linear distance between governing reference indicator 70 and droop reference indicator 100 thus defines the rotor speed operating range for helicopter 10 during OEI conditions and provides meaningful visual cues to assist the pilot in maintaining the rotor speed within the rotor speed operating range.

Returning the FIG. 3, when an OEI condition occurs shorty after helicopter 10 reaches takeoff decision point 82, the pilot will increase collective, add forward cyclic and cause helicopter 10 to begin a dive. The increase in collective will require additional power which is shown in FIG. 4B with indicator needle 46b moving into the thirty-second emergency power range 90. Upon entering the thirty-second emergency power range 90, OEI flag 84 changes to include a 30 SEC label and a timer that counts down from 0:30. In addition, indicator needle 46b now appears in yellow. As discussed herein, the continued takeoff in the OEI condition of helicopter 10 requires the highest power demand of any maneuver performed by helicopter 10 with a single engine. In this case, the pilot continues to add collective which results in engine 2 reaching emergency power limit indicator 92 and engine operating limit indicator 94, as best seen in FIG. 4C. At this point, the engine power is electronically limited by the full authority digital engine control (FADEC).

Additional power demand may now be satisfied using rotor inertia, wherein rotor speed is sacrificed in order to maintain rotorcraft performance. This loss in rotor speed is referred to herein as rotor droop, which is communicated to the pilot on bar-graph indicator 50 by pointer 68 moving down from governing reference indicator 70 (Nref=103 percent) to a location between governing reference indicator 70 and droop reference indicator 100, currently 101 percent. The visual cues provided by the rotor speed indication system of the present disclosure aid the pilot of helicopter 10 in maintaining the rotor speed above the minimum allowable rotor speed to complete the continued takeoff and climbout and/or the minimum rotor speed beyond which rotor speed recovery may be compromised. For example, as best seen in FIG. 4D, the current rotor speed has dropped to droop reference indicator 100, which represents 97 percent of the normal governing speed. Bar graph indicator 50 provides a clear indication to the pilot that the collective should be reduced to allow rotor speed recovery. In this manner, the pilot is better able to maintain the rotor speed within the rotor speed operating range by maintaining pointer 68 between governing reference indicator 70 and droop reference indicator 100.

Figure 4E:
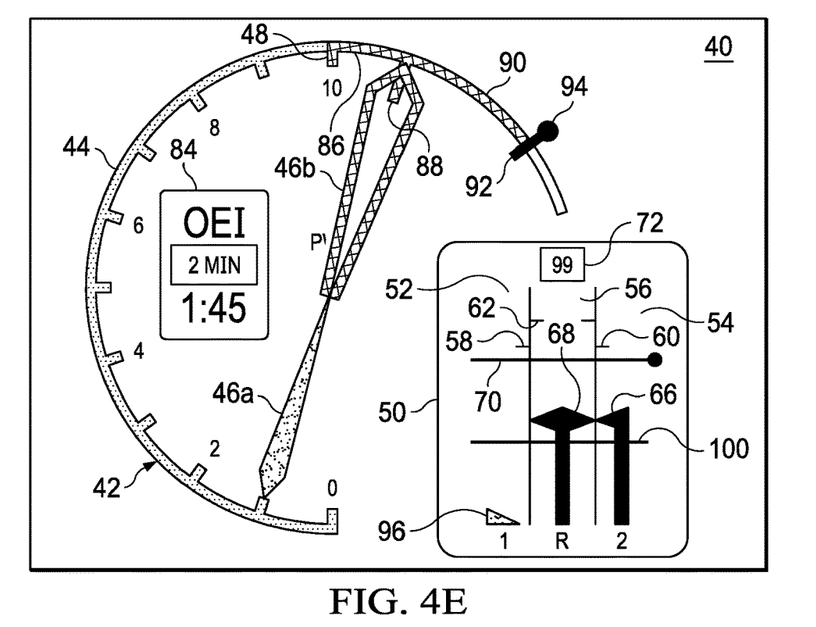

Continuing with this example, as helicopter 10 gains forward airspeed, the power demand begins to decline. As best seen in FIG. 3, as helicopter 10 begins its climbout, helicopter 10 transitions from thirty-second emergency power to two-minute contingency power. This configuration is reflected in FIG. 4E, in which indicator needle 46 is at contingency power limit indicator 88 and the pilot may continue to satisfy excess power demand using rotor inertia. Upon entering the two-minute contingency power range 86, OEI flag 84 changes to include a 2 MIN label and a timer that counts down from 2:00. In the illustrated embodiment, the current rotor speed is between governing reference indicator 70 and droop reference indicator 100 at 99 percent, which represents ongoing rotor droop but rotor speed recovery from the state depicted in FIG. 4D. Importantly, using the visual cues of the rotor speed indication system of the present disclosure, the pilot of helicopter 10 has maintained the rotor speed within the rotor speed operating range, in this case 97 percent to 103 percent, by maintaining pointer 68 between governing reference indicator 70 and droop reference indicator 100.

Figure 4F:
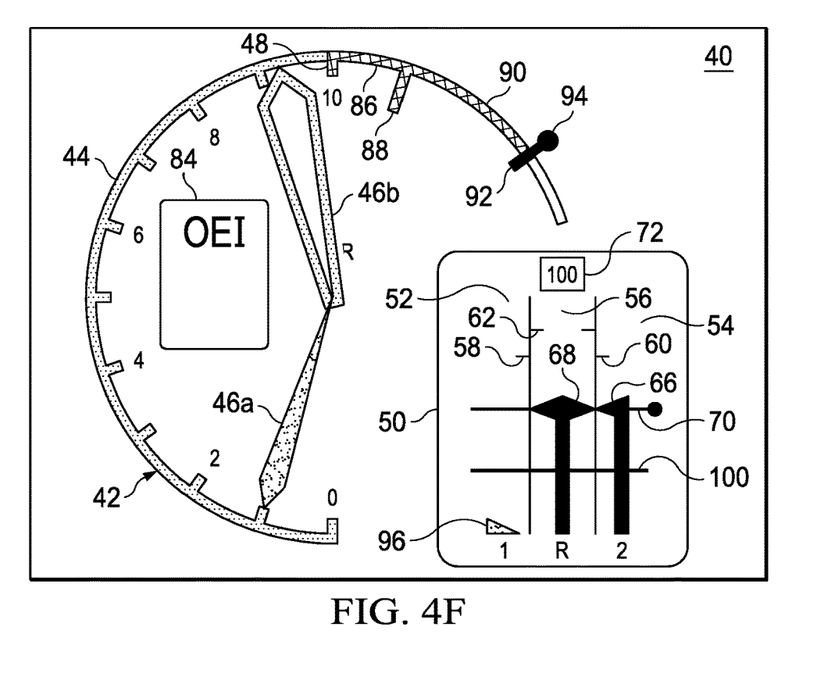

As best seen in FIG. 4F, after completing the Category-A continued takeoff and climbout, display 40 continues to reflect the OEI condition of helicopter 10 including presenting OEI flag 84, needle 46a near zero with grey coloring, OEI maximum continuous power (MCP) limit at location 10, two-minute contingency power range 86, contingency power limit indicator 88, thirty-second emergency power range 90, emergency power limit indicator 92 and engine operating limit indicator 94. In addition, bar-graph indicator 50 continues to show pointer 64 as grey wedge 96 and droop reference indicator 100. In the illustrated embodiment, helicopter 10 is now operating at the normal governing speed, which is reflected by governing reference indicator 70 as Nref=100 percent.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor speed indication system configured to communicate a rotor speed operating range for a twin engine rotorcraft having a rotor during one engine inoperable conditions, the rotor speed indication system comprising:
   a display;
   a governing reference indicator bar located on the display, the governing reference indicator bar being configured to communicate an upper operating range threshold;
   a droop reference indicator bar located on the display parallel to the governing reference indicator bar, the droop reference indicator bar being configured to communicate a lower operating range threshold;
   a sensor configured to measure a current rotor speed of the rotor; and
   a dynamic rotor speed indicator located on the display, the dynamic rotor speed indicator being configured to communicate the current rotor speed of the rotor;
   wherein, when the dynamic rotor speed indicator is positioned between the governing reference indicator bar and the droop reference indicator bar on the display, the current rotor speed of the rotor is within the rotor speed operating range.

2. The rotor speed indication system as recited in claim 1 wherein the upper operating range threshold further comprises a normal governing speed.

3. The rotor speed indication system as recited in claim 1 wherein the upper operating range threshold further comprises a takeoff governing speed.

4. The rotor speed indication system as recited in claim 1 wherein the upper operating range threshold further comprises a governing speed greater than a normal governing speed.

5. The rotor speed indication system as recited in claim 1 wherein the upper operating range threshold further comprises a governing speed that is 103 percent of a normal governing speed.

6. The rotor speed indication system as recited in claim 1 wherein the lower operating range threshold further comprises a minimum allowable rotor speed to provide continued takeoff and climbout performance.

7. The rotor speed indication system as recited in claim 1 wherein the lower operating range threshold further comprises a rotor droop speed less than a normal governing speed.

8. The rotor speed indication system as recited in claim 1 wherein the lower operating range threshold further comprises a rotor droop speed that is 97 percent of a normal governing speed.

9. The rotor speed indication system as recited in claim 1 wherein the governing reference indicator bar, the droop reference indicator bar and the dynamic rotor speed indicator further comprises a bar graph.

10. The rotor speed indication system as recited in claim 9 wherein the bar graph has a range of 90 percent to 110 percent of a normal governing speed.

11. The rotor speed indication system as recited in claim 9 wherein the rotor speed operating range further comprises a linear distance between the governing reference indicator bar and the droop reference indicator bar on the bar graph.

12. The rotor speed indication system as recited in claim 11 wherein the linear distance between the governing reference indicator bar and the droop reference indicator bar on the bar graph further comprises a range of at least one quarter of the bar graph.

13. The rotor speed indication system as recited in claim 1 further comprising a dynamic engine power indicator located on the display, the dynamic engine power indicator being configured to communicate an engine power level of an operating engine.

14. The rotor speed indication system as recited in claim 13 wherein the dynamic engine power indicator further comprises at least one rotary needle positioned within a power arc having one engine inoperable power ranges and an active limit indicator.

15. The rotor speed indication system as recited in claim 14 wherein the one engine inoperable power ranges further comprise a two-minute contingency power range and a thirty-second emergency power range.

16. The rotor speed indication system as recited in claim 15 further comprising a power range time indicator located on the display, the power range time indicator being configured to communicate a time remaining in an active one of the two-minute contingency power range and the thirty-second emergency power range.

17. A method of communicating a rotor speed operating range during one engine inoperable conditions in a rotorcraft, the method comprising:
   providing a display;
   communicating an upper operating range threshold by locating a governing reference indicator bar on the display;
   communicating a lower operating range threshold by locating a droop reference indicator bar on the display parallel to the governing reference indicator bar;
   measuring a current rotor speed with a sensor; and
   communicating the current rotor speed of the rotor by locating a dynamic rotor speed indicator on the display such that when the dynamic rotor speed indicator is between the governing reference indicator bar and the droop reference indicator bar on the display, the current rotor speed of the rotor is within the rotor speed operating range.

18. The method as recited in claim 17 wherein communicating the upper operating range threshold by locating the governing reference indicator bar on the display further comprises communicating a governing speed that is greater than a normal governing speed; and wherein communicating the lower operating range threshold by locating the droop reference indicator bar on the display further comprises communicating a rotor droop speed that is less than the normal governing speed.

19. The method as recited in claim 17 further comprising:
locating the governing reference indicator bar, the droop reference indicator bar and the dynamic rotor speed indicator on a bar graph having a range of 90 percent to 110 percent of a normal governing speed;
expressing the rotor speed operating range as a linear distance between the governing reference indicator bar and the droop reference indicator bar on the bar graph; and
scaling the linear distance between the governing reference indicator bar and the droop reference indicator bar on the bar graph to have a range of at least one quarter of the bar graph.

20. A rotorcraft comprising:
a body;
first and second engines disposed within the body;
a transmission coupled to the first and second engines and having a drive shaft;
a rotor coupled to and operable to rotate with the drive shaft; and
a rotor speed indication system disposed within the body and configured to communicate a rotor speed operating range during one engine inoperable conditions, the rotor speed indication system including:
a display;
a governing reference indicator bar located on the display, the governing reference indicator bar being configured to communicate an upper operating range threshold;
a droop reference indicator bar located on the display parallel to the governing reference indicator bar, the droop reference indicator bar being configured to communicate a lower operating range threshold;
a sensor configured to measure a current rotor speed of the rotor; and
a dynamic rotor speed indicator located on the display, the dynamic rotor speed indicator being configured to communicate the current rotor speed of the rotor;
wherein, when the dynamic rotor speed indicator is positioned between the governing reference indicator bar and the droop reference indicator bar on the display, the current rotor speed of the rotor is within the rotor speed operating range.

* * * * *